(12) United States Patent
Kim et al.

(10) Patent No.: US 8,548,329 B2
(45) Date of Patent: Oct. 1, 2013

(54) APPARATUS AND METHOD FOR RELAYING IN GIGABIT PASSIVE OPTICAL NETWORK

(75) Inventors: Kwang Ok Kim, Jeollabuk-do (KR);
Kyeong Hwan Doo, Daejeon (KR);
Sang Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 519 days.

(21) Appl. No.: 12/817,279

(22) Filed: Jun. 17, 2010

(65) Prior Publication Data

US 2011/0135306 A1  Jun. 9, 2011

(30) Foreign Application Priority Data

Dec. 4, 2009  (KR) ........................ 10-2009-0119957

(51) Int. Cl.
*H04J 14/00* (2006.01)

(52) U.S. Cl.
USPC .......................................................... 398/68

(58) Field of Classification Search
USPC .......................................................... 398/68
See application file for complete search history.

(56) References Cited

U.S. PATENT DOCUMENTS

| | | | |
|---|---|---|---|
| 7,818,389 B1 * | 10/2010 | Chiang et al. ................. | 709/212 |
| 2007/0147837 A1 | 6/2007 | Yoo et al. | |
| 2008/0138073 A1 | 6/2008 | Kim et al. | |
| 2010/0239251 A1 * | 9/2010 | Biegert et al. ................. | 398/58 |
| 2011/0305455 A1 * | 12/2011 | Helleberg Andersen et al. ............................ | 398/41 |

FOREIGN PATENT DOCUMENTS

| | | |
|---|---|---|
| KR | 2008-0053117 A | 6/2008 |
| KR | 2008-0107796 A | 12/2008 |
| KR | 2009-0018573 A | 2/2009 |
| KR | 2009-0071922 A | 7/2009 |
| WO | WO-2009/025474 A2 | 2/2009 |

* cited by examiner

*Primary Examiner* — Danny Leung
(74) *Attorney, Agent, or Firm* — Rabin & Berdo, P.C.

(57) ABSTRACT

A relaying method of an optical signal of a hybrid relaying apparatus in a gigabit passive optical element includes: selecting and receiving any one of a first serial electrical signal corresponding to a downlink wavelength division multiplexing-passive optical line terminal (WDM-PON OLT) optical signal and a second serial electrical signal corresponding to a downlink gigabit passive optical network optical line terminal (GPON OLT) optical signal; modulating the downlink serial electrical signal to a downlink GPON transmission convergence (GTC) frame; extracting control information for uplink transmission from the downlink GTC frame; converting the downlink GTC frame into the downlink serial electrical signal; and converting the converted serial electrical signal into an optical signal and transmitting the converted optical signal in a GPON OLT optical transceiver.

13 Claims, 11 Drawing Sheets

APPARATUS AND METHOD FOR RELAYING IN GIGABIT PASSIVE OPTICAL NETWORK

CROSS-REFERENCE TO RELATED APPLICATION

This application claims priority to and the benefit of Korean Patent Application No. 10-2009-0119957 filed in the Korean Intellectual Property Office on Dec. 4, 2009, the entire contents of which are incorporated herein by reference.

BACKGROUND OF THE INVENTION (a) Field of the Invention

The present invention relates to a relaying apparatus in a gigabit passive optical network and a relaying method using the same.

(b) Description of the Related Art

A passive optical network (PON) technology is one of fiber to the home (FTTH) technologies proposed to effectively supply a bandwidth required for a subscriber terminal. The PON technology is classified into TDM-PON using a time division multiplexing (TDM) method and WDM-PON using a wavelength division multiplexing (WDM) method. The TDM-PON includes broadband PON (BPON), Ethernet PON (EPON), and gigabit PON (GPON), as examples. The BPON provides an asynchronous transfer mode (ATM) service as a method that is standardized by the International Telecommunication Union-Telecommunication Standardization Sector (ITU-T) G.983.x. The BPON is not suitable for an internet protocol (IP)-based service, and provides a bandwidth of 622 Mb/s (megabits per second) at a maximum. The EPON provides only an Ethernet service as a method that is standardized by the Institute of Electrical and Electronics Engineers (IEEE) 802.3ah. The EPON provides a bandwidth of the maximum uplink/downlink of 1.25 Gb/s (gigabits per second). The GPON provides a maximum uplink bandwidth of 1.244 Gb/s and a downlink bandwidth of 2.488 Gb/s as a method that is standardized by the ITU-T G.984.x in order to solve a problem of the bandwidth of the BPON and receive various multi-protocols, for example, ATM, TDM (time division multiplexing), and Ethernet service. In recent years, an optical network has been required to provide a bandwidth of 1 Gb/s or more in order to provide various multimedia contents, for example, IPTV (IP television), VoD (video on demand), games, etc. to subscribers, and the GPON satisfying this is in the limelight.

The GPON can service a maximum transmission distance of 20 Km as a point to multipoint network structure to share one optical line terminal (OLT) through a splitter in which 64 optical network units (ONUs) are passive elements. In general, the OLT is positioned at a central office and the ONU is positioned in a subscriber's home or a subscriber's terminal box. In the GPON, since a plurality of subscribers share the bandwidth through a time domain, the bandwidth that the subscribers can use is reduced as the number of subscribers increases. Accordingly, the GPON is suitable for a small-sized network and is not suitable for a large-sized network having hundreds of subscribers or more.

In recent years, as extension of a service area has been an issue, a method that is capable of servicing a transmission distance of 60 Km has been evaluated. For this, the long-reach PON (LR-PON) based on the GPON, which provides a long-reach service to a remote node of a trunk optical fiber section by using an active element-based relaying apparatus, has been standardized in the ITU-T G.984.6. In the LR-PON, since the number of central offices can be reduced, it is possible to save management and maintenance costs of the network.

Meanwhile, the WDM-PON that is one of the PON technologies provides service to subscribers in different wavelengths. Since a bandwidth of 1 Gb/s per wavelength is provided, each subscriber can receive a bandwidth of 1 Gb/s. However, since there are few services using a wide bandwidth, the WDM-PON has comparatively poorer bandwidth using efficiency than the GPON. Further, since the WDM-PON has light sources (laser diode, LD) having different wavelengths for each subscriber, the implementation cost of the WDM-PON is high and it is difficult to manage the WDM-PON.

Therefore, a hybrid GPON structure applying the WDM-PON to a relaying trunk network section of the GPON is being researched. In the hybrid GPON, optical signals having a single wavelength outputted from each OLT port are converted into a plurality of wavelengths through the WDM-PON and transmitted through a long-reach single trunk optical fiber. Each of the transmitted optical signals are separated from the remote node and thereafter converted into an optical signal having a single wavelength and transmitted to the ONUs. That is, ONUs of a maximum 64 branches can receive the single wavelength. Accordingly, the hybrid GPON can solve a problem in the bandwidth using efficiency of the WDM-PON and can provide a service to a large number of subscribers by using the single trunk optical fiber. Further, since different light sources are used for each ONU group, it is possible to save implementation cost of a large-scale network at the time of implementing the large-scale network. Accordingly, the hybrid GPON is suitable for construction of a large-scale network and long-reach transmission.

FIG. 1 is a diagram showing a known wavelength division multiplexing/time division multiplexing (WDM/TDM) hybrid optical network.

Referring to FIG. 1, the WDM/TDM hybrid optical network includes TDM-PONs 100, 130, and 140, a hybrid OLT 110, and a hybrid relaying apparatus 120. The TDM-PON includes a TDM-PON OLT 100, a splitter 130, and a TDM-PON ONU 140. The TDM-PON includes N TDM-PON OLTs 100 and N splitters 130 corresponding thereto, and includes a plurality of TDM-PON ONUs 140 branched from each splitter 130. The hybrid OLT 110 includes a TDM-PON optical transceiver (TDM-PON TRx) 111, a WDM-TDM matcher (WTA) 112, a WDM-PON optical transceiver (WDM-PON TRx) 113, and a WDM wavelength branching multiplexer (WDM MUX) 114. Each of the TDM-PON optical transceiver 111, the WDM-TDM matcher 112, and the WDM-PON optical transceiver 113 of the hybrid OLT 110 may be provided in N numbers to correspond to N TDM-PON OLTs 100. The hybrid relaying apparatus 120 includes a WDM wavelength branching multiplexer (WDM MUX) 124, a WDM-PON optical transceiver (WDM-PON TRx) 123, a WDM-TDM matcher (WTA) 122, and a TDM-PON optical transceiver (TDM-PON TRx) 121. Each of the TDM-PON optical transceiver 123, the WDM-TDM matcher 122, and the TDM-PON optical transceiver 121 of the hybrid relaying apparatus 120 may be provided in N numbers to correspond to N TDM-PON OLTs 100. The hybrid OLT 110 may be positioned at the central office and the hybrid relaying apparatus 120 may be positioned at the remote node RN. The hybrid OLT 110 and the hybrid relaying apparatus 120 enable long-reach transmission and high branching in comparison with the known TDM-PON, for example, the GPON.

In downlink transmission, an optical signal of $\lambda_{dT}$ is transmitted to the TDM-PON optical transceiver 111 of the hybrid OLT 110 from the TDM-PON OLT 100 and is converted into an electrical signal, and the WDM-TDM matcher 112 matches the electrical signal with the WDM-PON optical transceiver 113. N WDM-PON optical transceivers 113 generate optical signals having different wavelengths $\lambda_{d1}$, $\lambda_{d2}, \ldots, \lambda_{dN}$ from the electrical signal, and one WDM wavelength branching multiplexer 114 connected with N WDM-PON optical transceivers 113 multiplexes the optical signals having different wavelengths and transmits them to the hybrid relaying apparatus 120. The WDM wavelength branching multiplexer 124 of the hybrid relaying apparatus 120 branches the optical signals having different wavelengths. N WDM-PON optical transceivers 123 convert the optical signals having different wavelengths into the electrical signal, and the WDM-TDM matcher 122 matches the electrical signal with the TDM-PON optical transceiver 121. The TDM-PON optical transceiver 121 converts the electrical signal into the optical signal of $\lambda_{dT}$. The splitter 130 transmits the optical signal of $\lambda_{dT}$ to the plurality of TDM-PON ONUs 140 branched from the splitter 130.

In uplink transmission, an optical signal of $\lambda u_T$ is transmitted to the TDM-PON optical transceiver 121 of the hybrid relaying apparatus 120 from the TDM-PON ONU 140 and is converted into the electrical signal, and the WDM-TDM matcher 122 matches the electrical signal with the WDM-PON optical transceiver 123. N WDM-PON optical transceivers 123 generate optical signals having different wavelengths $\lambda_{u1}, \lambda_{u2}, \ldots, \lambda_{uN}$ from the electrical signal, and the WDM wavelength branching multiplexer 124 multiplexes the optical signals having different wavelengths and transmits them to the hybrid OLT 110. The WDM wavelength branching multiplexer 114 of the hybrid OLT 110 branches the optical signals having different wavelengths. N WDM-PON optical transceivers 113 convert the optical signals having different wavelengths into the electrical signal, and the WDM-TDM matcher 112 matches the electrical signal with the TDM-PON optical transceiver 111. The TDM-PON optical transceiver 111 converts the electrical signal into the optical signal of $\lambda_{UT}$. The optical signal of $\lambda_{uT}$ is transmitted to the TDM-PON OLT 100.

The WDM/TDM hybrid optical network shown in FIG. 1 enables a high branching rate and long-reach transmission in comparison with the TDM-PON or WDM-PON. However, the optical signal that the TDM-PON ONU 140 uplink-transmits is transmitted in a burst in accordance with the TDM method. Therefore, the hybrid relaying apparatus 120 needs a control signal for converting a burst optical signal into the electrical signal. Further, in the section using the WDM-PON technology, the optical signal is continuously transmitted, but when the optical signal is transmitted in the burst like the known WDM-TDM hybrid optical network, an error may be generated. Further, since the WDM-TDM matcher 122 of the hybrid relaying apparatus 120 provides only a matching function using the electrical signal, an additional device and an additional channel are required to collect state monitoring information of the TDM-PON optical transceiver 121 and the WDM-PON optical transceiver 123 of the hybrid relaying apparatus 120. System complexity is increased due to the additional device and channel.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a relaying apparatus for providing high branching and long-reach transmission in a gigabit passive optical network, and a relaying method using the same.

An exemplary embodiment of the present invention provides a relaying method of an optical signal in a hybrid relaying apparatus of a gigabit passive optical element including: selecting and receiving a first downlink electrical signal corresponding to a downlink wavelength division multiplexing-passive optical line terminal (WDM-PON OLT) optical signal and a second downlink electrical signal corresponding to a downlink gigabit passive optical network optical line terminal (GPON OLT) optical signal; modulating the downlink electrical signal to a downlink GPON transmission convergence (GTC) frame; extracting control information for uplink transmission from the downlink GTC frame; converting the downlink GTC frame into the downlink electrical signal; converting the converted downlink electrical signal into an optical signal in a GPON OLT optical transceiver; and transmitting the converted optical signal to a GPON ONU.

The relaying method of an optical signal may further include: extracting an uplink burst optical signal by using the extracted control information, converting the extracted burst optical signal into the serial electrical signal, modulating an uplink GTC frame from a burst electrical signal, converting the modulated burst GTC frame into a continuous GTC frame, converting the continuous GTC frame into an electrical signal, and converting the converted electrical signal into the selected OLT optical signal.

Another embodiment of the present invention provides a hybrid relaying apparatus in a gigabit passive optical network including: a GPON framer modulating any one of a first downlink electrical signal corresponding to a downlink wavelength division multiplexing-passive optical line terminal (WDM-PON OLT) optical signal and a second downlink electrical signal corresponding to a downlink gigabit passive optical network optical line terminal (GPON OLT) optical signal to a downlink GPON transmission convergence (GTC) frame, extracting control information for uplink transmission from the downlink GTC frame, and converting the downlink GTC frame into an electrical signal or extracting a burst uplink GTC frame by using extracted control information and converting the extracted frame into a continuous GTC frame; and a GPON OLT optical transceiver converting the converted electrical signal into an optical signal.

According to an embodiment of the present invention, a relaying apparatus provides high branching and a long-reach service. Further, control information is extracted from a signal in downlink transmission to be used for uplink transmission, and the state of an optical transceiver in the relaying apparatus may be transmitted to a central office without an additional channel or device. In addition, the relaying apparatus according to the embodiment of the present invention may be used as a WDM/GPON hybrid relaying apparatus using WDM-PON in a trunk optical fiber section or used as a GPON reach extender in accordance with a relaying mode.

DETAILED DESCRIPTION OF THE EMBODIMENTS

Figure 1:
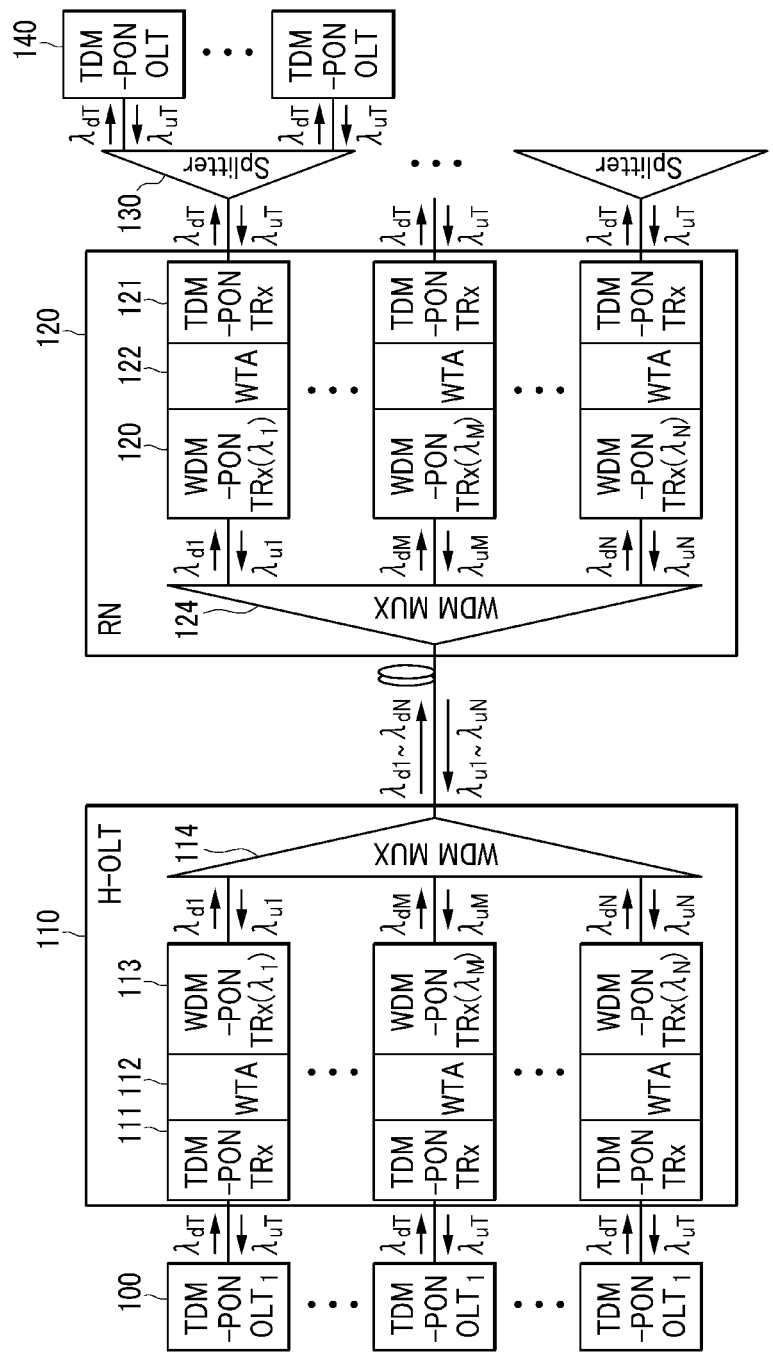
FIG. 1 is a diagram showing a known wavelength division multiplexing/time division multiplexing (WDM/TDM) hybrid optical network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Figure 2:
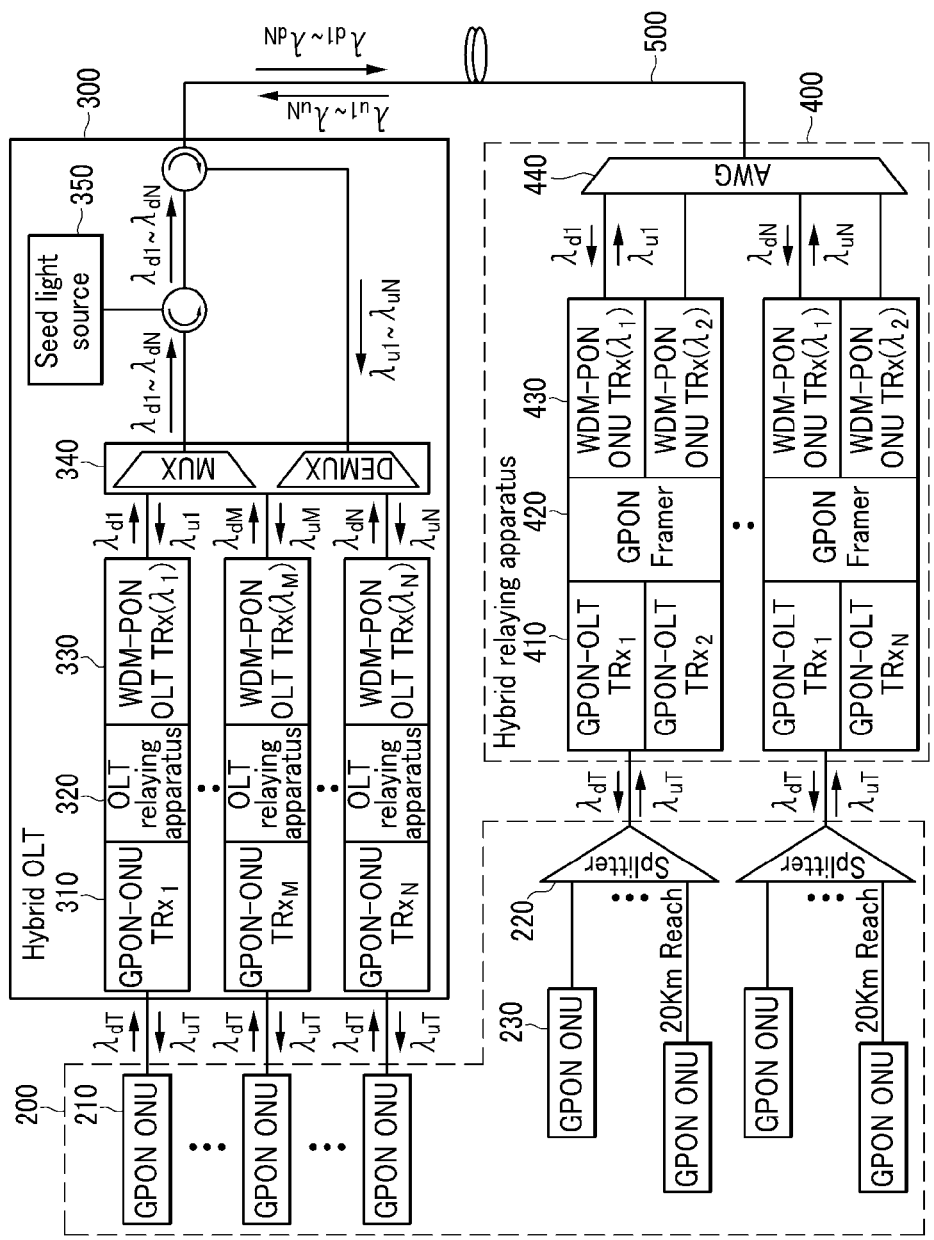
FIG. 2 is a diagram showing a hybrid optical network according to an embodiment of the present invention.

FIG. 2 is a diagram showing a hybrid optical network according to an embodiment of the present invention.

Referring to FIG. 2, the hybrid optical network includes a GPON system 200, a hybrid OLT 300, and a hybrid relaying apparatus 400. The GPON system 100 includes N GPON OLTs 210, N splitters 220 corresponding thereto, and a plurality of GPON ONUs 230 branched from each splitter 220. Each splitter 220, for example, may have 64 branches. The hybrid OLT 300 includes a GPON ONU optical transceiver (GPON ONU TRx) 310, an OLT relaying apparatus 320, a WDM-PON OLT optical transceiver (WDM-PON OLT TRx) 330, a MUX/DEMUX device 340, and a seed light source device 350. The hybrid relaying apparatus 400 includes an arrayed waveguide grating (AWG) 440, a WDM-PON ONU optical transceiver (WDM-PON ONU TRx) 430, a GPON framer 420, and a GPON OLT optical transceiver (GPON OLT TRx) 410. N GPON OLTs 210 and the hybrid OLT 300 may be positioned at a central office, and the hybrid relaying apparatus 400 may be positioned at a remote node.

The hybrid OLT 300 uses GPON ONU optical transceivers 310, OLT relaying apparatuses 320, and WDM-PON OLT optical transceivers 330 of the same number (i.e., N) as the GPON OLT 210 in order to adopt the WDM-PON technology without changing a hardware device of the GPON system 200. The GPON ONU optical transceiver 310 is, one to one, connected with the WDM-PON OLT optical transceiver 330 through the OLT relaying apparatus 320. The GPON ONU optical transceiver 310 is connected with the GPON OLT 210 corresponding thereto through an optical line. The GPON ONU optical transceiver 310 converts an optical signal of $\lambda_{dT}$ transmitted from the GPON OLT 210 and transmits the electrical signal to the WDM-PON OLT optical transceiver 330, or converts the electrical signal transmitted from the WDM-PON OLT optical transceiver 330 into an optical signal of $\lambda_{uT}$ and transmits the optical signal to the GPON OLT 210. The OLT relaying apparatus 320 relays the electrical signal between the GPON ONU optical transceiver 310 and the WDM-PON OLT optical transceiver 330. N WDM-PON OLT optical transceivers 330 convert the electrical signals received from the GPON ONU optical transceivers 310 corresponding thereto into optical signals having different wavelengths $\lambda_{d1}, \ldots, \lambda_{dN}$ or convert optical signals having different wavelengths $\lambda_{u1}, \ldots, \lambda_{uN}$ into electrical signals and transmit the electrical signals to the corresponding GPON ONU optical transceivers 310. The seed light source device 350 generates an independent wavelength to be used to generate optical signals having different wavelengths in N WDM-PON OLT optical transceivers 330. The MUX/DEMUX device 340 multiplexes the optical signals $\lambda_{d1}, \ldots, \lambda_{dN}$ received from N WDM-PON OLT optical transceivers 330, or demultiplexes the multiplexed optical signals $\lambda_{u1}, \ldots, \lambda_{uN}$ and may transmit them to N WDM-PON OLT optical transceivers 330.

The optical signals $\lambda_{d1}, \ldots, \lambda_{dN}$ having different wavelengths are multiplexed in the MUX/DEMUX device 340, and thereafter are transmitted to the hybrid relaying apparatus 400 through a trunk optical fiber 500. Further, the multiplexed optical signals $\lambda_{u1}, \ldots, \lambda_{uN}$ having different wavelengths transmitted from the hybrid relaying apparatus 220 through the trunk optical fiber 500 are demultiplexed in the MUX/DEMUX device 340. A section of the trunk optical fiber 500 may have a long range of 30 Km. When the WDM technology is applied to the trunk optical fiber section, as many trunk optical fibers as the number of wavelengths are not used but one trunk optical fiber is used, thereby saving network construction cost.

The hybrid relaying apparatus 400 uses the WDM-PON ONU optical transceiver 430 and the GPON OLT optical transceiver 410 corresponding to the GPON OLT 210, and the WDM-PON ONU optical transceiver 430 and the GPON OLT optical transceiver 410 are connected with the GPON framer 420. The arrayed waveguide grating (AWG) 440 selects a predetermined wavelength from the optical signal transmitted through the trunk optical fiber 500. The optical signal having the predetermined wavelength is transmitted to the corresponding GPON ONU 230 through the corresponding WDM-PON ONU optical transceiver 430, the GPON framer 420, the GPON OLT optical transceiver 410, and the splitter 220. That is, the hybrid relaying apparatus 400 converts one optical signal among the optical signals having different wavelengths in the trunk optical fiber 500 into a downlink wavelength of the GPON OLT 210, or converts an uplink wavelength of the GPON ONU 230 to a predetermined wavelength. The GPON framer 420 performs re-amplify, re-shape, and re-time (3R) optical-electrical-optical conversion for the signal received from the GPON OLT optical transceiver 410 or the WDN-PON ONU optical transceiver 430. In the downlink transmission, the GPON framer 420 extracts control information from the downlink optical signal to be used for the uplink transmission.

Herein, the WDM-PON OLT optical transceiver 330 and the WDM-PON ONU optical transceiver 430 may use, for example, a reflective semiconductor optical amplifier (RSOA) method, which is a wavelength utilizing method. According to the RSOA method, the WDM-PON ONU optical transceiver 430 of the hybrid relaying apparatus 400 remodulates the downlink-transmitted optical signal to be used for the uplink-transmitted optical signal. In this case, since the WDM-PON ONU optical transceiver 430 of the hybrid relaying apparatus 400 does not need an additional light source, the WDM-PON ONU optical transceiver 430 may be implemented independently to the wavelength. Consequently, since one kind of broad-spectrum light source (BLS) is installed at the central office, construction cost is saved.

Figure 3:
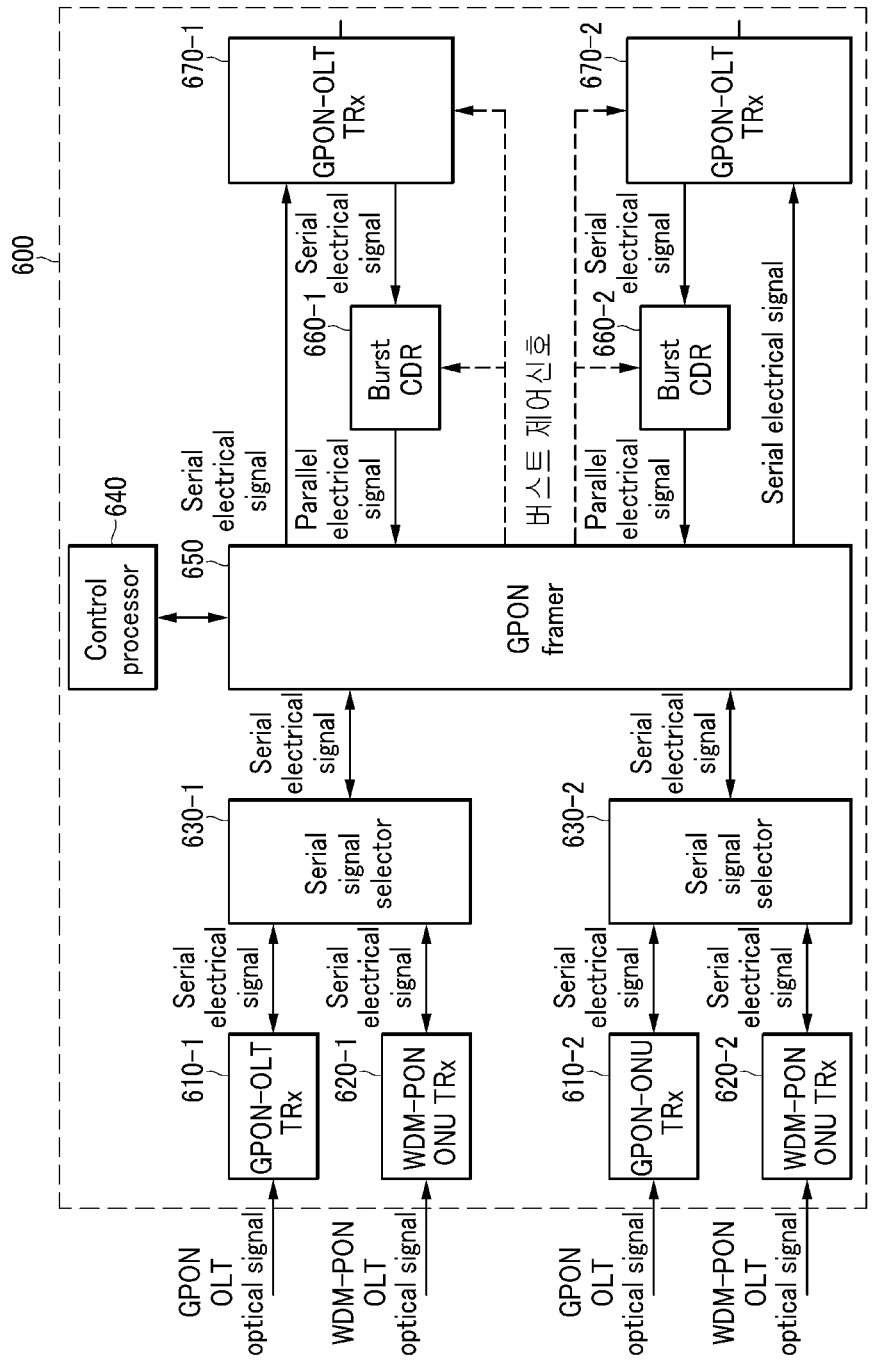
FIG. 3 is a detailed block diagram of a hybrid relaying apparatus 600 according to an embodiment of the present invention.
Figure 4:
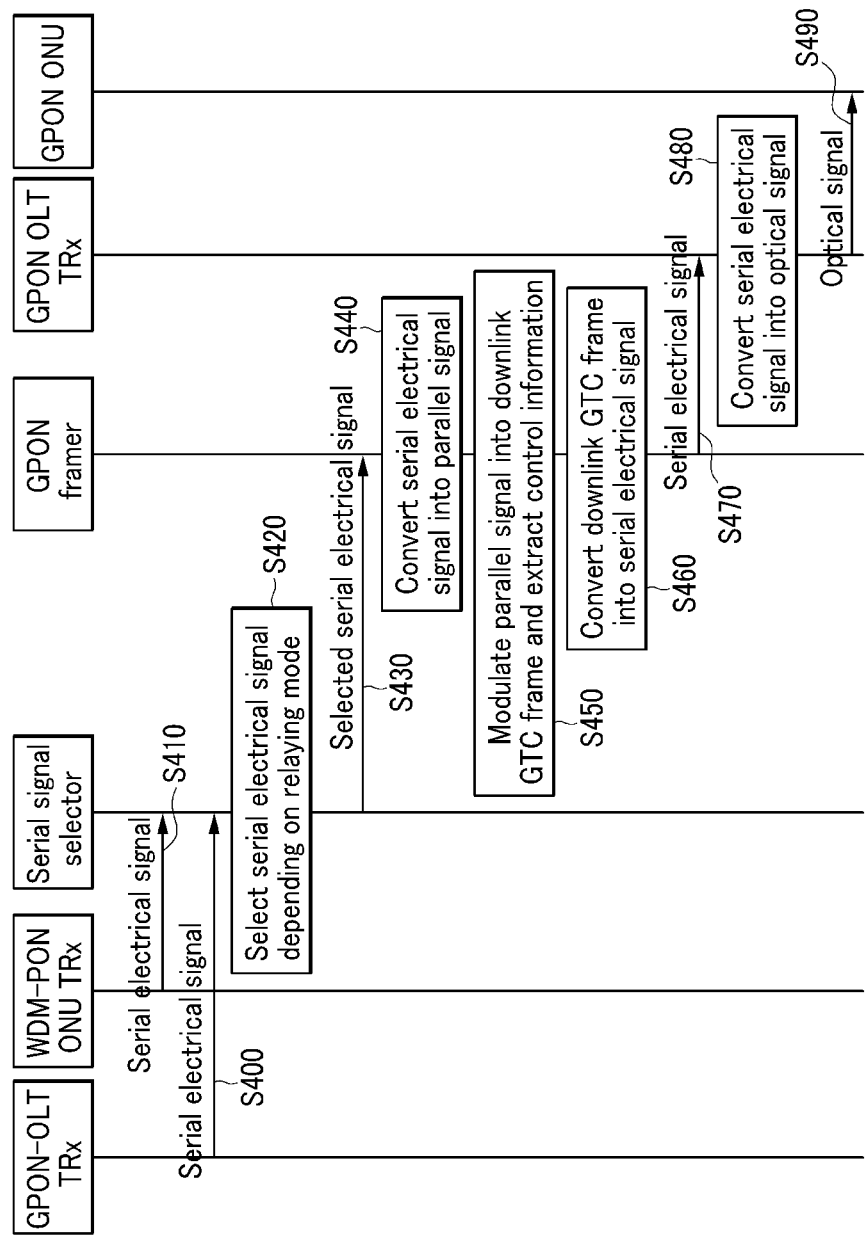
FIG. 4 is a flowchart illustrating a downlink transmission method of a hybrid relaying apparatus 600 according to an embodiment of the present invention.
Figure 5:
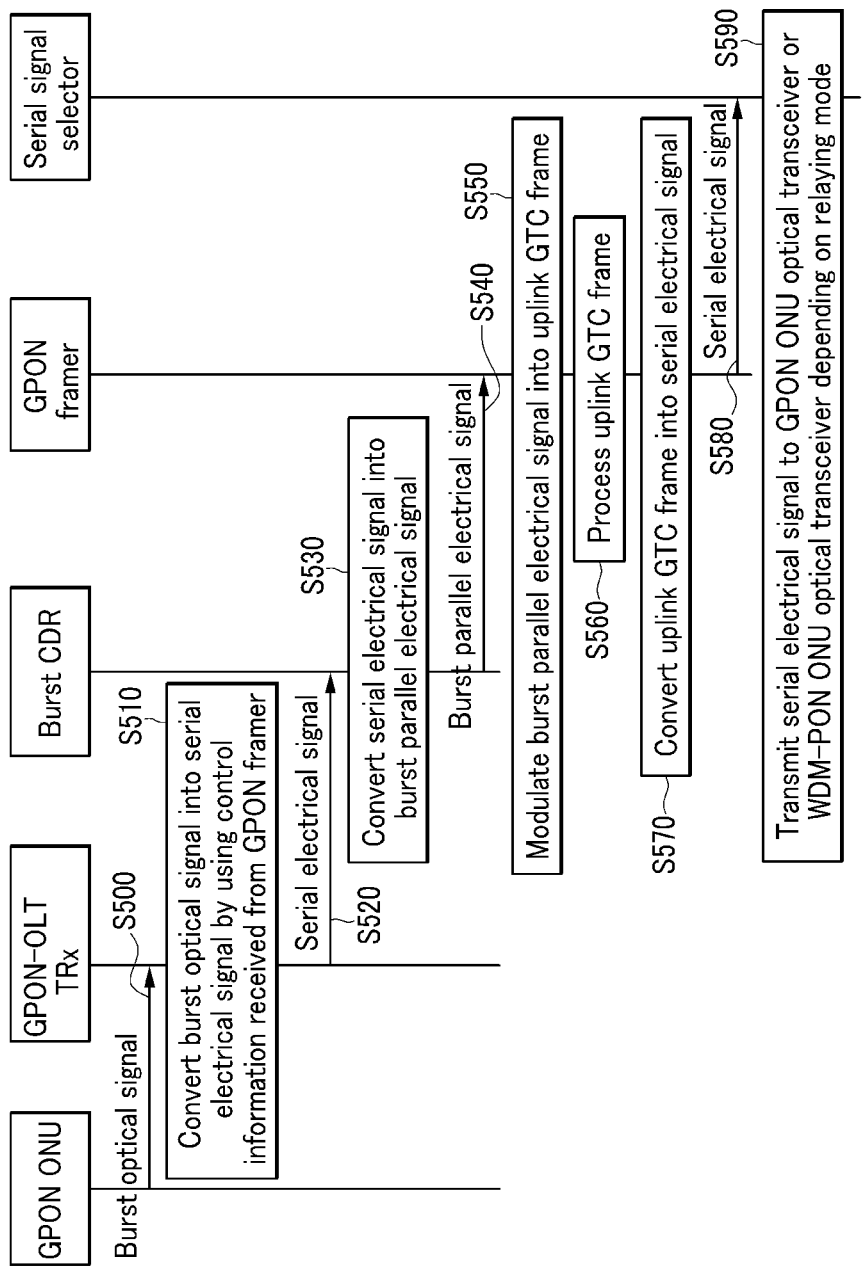
FIG. 5 is a flowchart illustrating an uplink transmission method of a hybrid relaying apparatus 600 according to an embodiment of the present invention.

FIG. 3 is a detailed block diagram of a hybrid relaying apparatus 600 according to an embodiment of the present invention, FIG. 4 is a flowchart illustrating a downlink transmission method of a hybrid relaying apparatus 600 according to an embodiment of the present invention, and FIG. 5 is a flowchart illustrating an uplink transmission method of a hybrid relaying apparatus 600 according to an embodiment of the present invention. For convenience of description, it is assumed that N is 2 in FIGS. 3 to 5.

Referring to FIG. 3, the hybrid relaying apparatus 600 includes GPON ONU optical transceivers 610-1 and 610-2, WPON ONU optical transceivers 620-1 and 620-2, serial signal selectors 630-1 and 630-2, a control processor 640, a GPON framer 650, burst clock and data recoveries (CDRs) 660-1 and 660-2, and GPON OLT optical transceivers 670-1 and 670-2.

Referring to FIGS. 3 and 4, the GPON ONU optical transceivers 610-1 and 610-2 convert the optical signal received from the GPON OLT 210 positioned at the central office into a serial electrical signal and transmit the serial electrical signal to the serial signal selectors 630-1 and 630-2 (S400). The WDM-PON ONU optical transceivers 620-1 and 620-2 convert the optical signal received from the GPON OLT 210 positioned at the central office through the GPON ONU optical transceiver 310, the WDM-PON OLT optical transceiver 330, and the AWG 440 into the serial electrical signal, and transmit the serial electrical signal to the serial signal selectors 630-1 and 630-2 (S410).

The serial signal selectors 630-1 and 630-2 select the serial electrical signal transmitted from the GPON ONU optical transceivers 610-1 and 610-2 or select the serial electrical signal transmitted from the WDM-PON ONU optical transceivers 620-1 and 620-2 depending on a relaying mode (S420), and transmit the selected serial electrical signal to the GPON frame 650 (S430). The hybrid relaying apparatus 600 may take a GPON relaying mode or a WDM-PON relaying mode. When the hybrid relaying apparatus 600 takes the GPON relaying mode, the serial signal selectors 630-1 and 630-2 select the serial electrical signal transmitted from the GPON ONU optical transceivers 610-1 and 610-2. At this time, the hybrid relaying apparatus 600 may be used as a GPON reach extender of the re-amplify, re-shape, and re-time (3R) optical-electrical-optical converting method according to the ITU-T G.984.6 standard. When the hybrid relaying apparatus 600 takes the WDM-PON relaying mode, the serial signal selectors 630-1 and 630-2 select the serial electrical signal transmitted from the WDM-PON ONU optical transceivers 620-1 and 620-2. At this time, the hybrid relaying apparatus 600 may be used as the WDM-PON-based hybrid relaying apparatus adopting the WDM technology in the trunk optical fiber section. The serial signal selectors 630-1 and 630-2 may select the serial electrical signal depending on the relaying mode by selecting, for example "0" or "1". The relaying mode may be determined by the central office. For example, the relaying mode may be remotely determined by the control signal received from the central office. Further, the relaying mode may be determined by a network provider.

The GPON framer 650 converts the serial electrical signal into a parallel signal (S440) and modulates the parallel signal to a GPON transmission convergence (GTC) frame to extract the control information (S450). After the control information is extracted, the GPON framer 650 converts a downlink GTC frame into the serial electrical signal again (S460). The control information may include uplink band allocation information, for example, information on an estimated arrival time of the uplink GTC frame. Further, the control information may include information relating to the burst control signal requiring the GPON OLT optical transceivers 670-1 and 670-2 and the burst CDRs 660-1 and 660-2 in the uplink transmission, for example, an effective section of the burst optical signal.

The GPON framer 650 transmits the serial electrical signal to the GPON OLT optical transceivers 670-1 and 670-2 (S470), and the GPON OLT optical transceivers 670-1 and 670-2 convert the serial electrical signal into the optical signal (S480) and transmit the optical signal to the GPON ONU 230 through the splitter 220 (S490).

Referring to FIGS. 3 and 5, the GPON OLT optical transceivers 670-1 and 670-2 receives the burst optical signal from the GPON ONU 230 through the splitter 220 (S500), and convert the burst optical signal into the serial electrical signal by using the control information received from the GPON framer 650 (S510). The control information may include the information on the effective section of the burst optical signal.

The GPON OLT optical transceivers 670-1 and 670-2 transmit the serial electrical signal to the burst CDRs 660-1 and 660-2 (S520), and the burst CDRs 660-1 and 660-2 convert the serial electrical signal into a burst parallel electrical signal (S530). At this time, the burst CDRs 660-1 and 660-2 may convert the serial electrical signal by using the control information received from the GPON framer 650.

The GPON framer 650 receives the burst parallel electrical signal from the burst CDRs 660-1 and 660-2 (S540), modulates the burst parallel electrical signal to the uplink GTC frame (S550), and processes the uplink GTC frame (S560). That is, the GPON framer 650 converts the uplink GTC frame of a burst mode into the uplink GTC frame of a continuous mode. A section in the uplink GTC frame of the burst mode without data is filled with a preamble. Further, when the central office requests the state monitoring information of the hybrid relaying apparatus 600, the GPON framer 650 inserts an OMCI packet into the uplink GTC frame in response thereto. For this, the GPON framer 650 needs to be ranged to the GPON OLT 210. The GPON framer 650 converts the uplink GTC frame into the serial electrical signal (S570) and transmits the serial electrical signal to the serial signal selectors 630-1 and 630-2 (S580).

The serial signal selectors 630-1 and 630-2 transmits the serial electrical signal to the GPON ONU optical transceivers 610-1 and 610-2 or the WDM-PON ONU optical transceivers 620-1 and 620-2 depending on the relaying mode (S550). When the GPON relaying mode is taken, the serial signal selectors 630-1 and 630-2 transmit the serial electrical signal to the GPON ONU optical transceivers 610-1 and 610-2. When the WDM-PON relaying mode is taken, the serial signal selectors 630-1 and 630-2 transmit the serial electrical signal to the WDM-PON ONU optical transceivers 620-1 and 620-2. The serial signal selectors 630-1 and 630-2 may select the serial electrical signal depending on the relaying mode by selecting, for example "0" or "1".

The GPON ONU optical transceivers 610-1 and 610-2 or the WDM-PON ONU optical transceivers 620-1 and 620-2 convert the serial electrical signal into the optical signal and transmit the optical signal to the GPON OLT 210.

Figure 6:
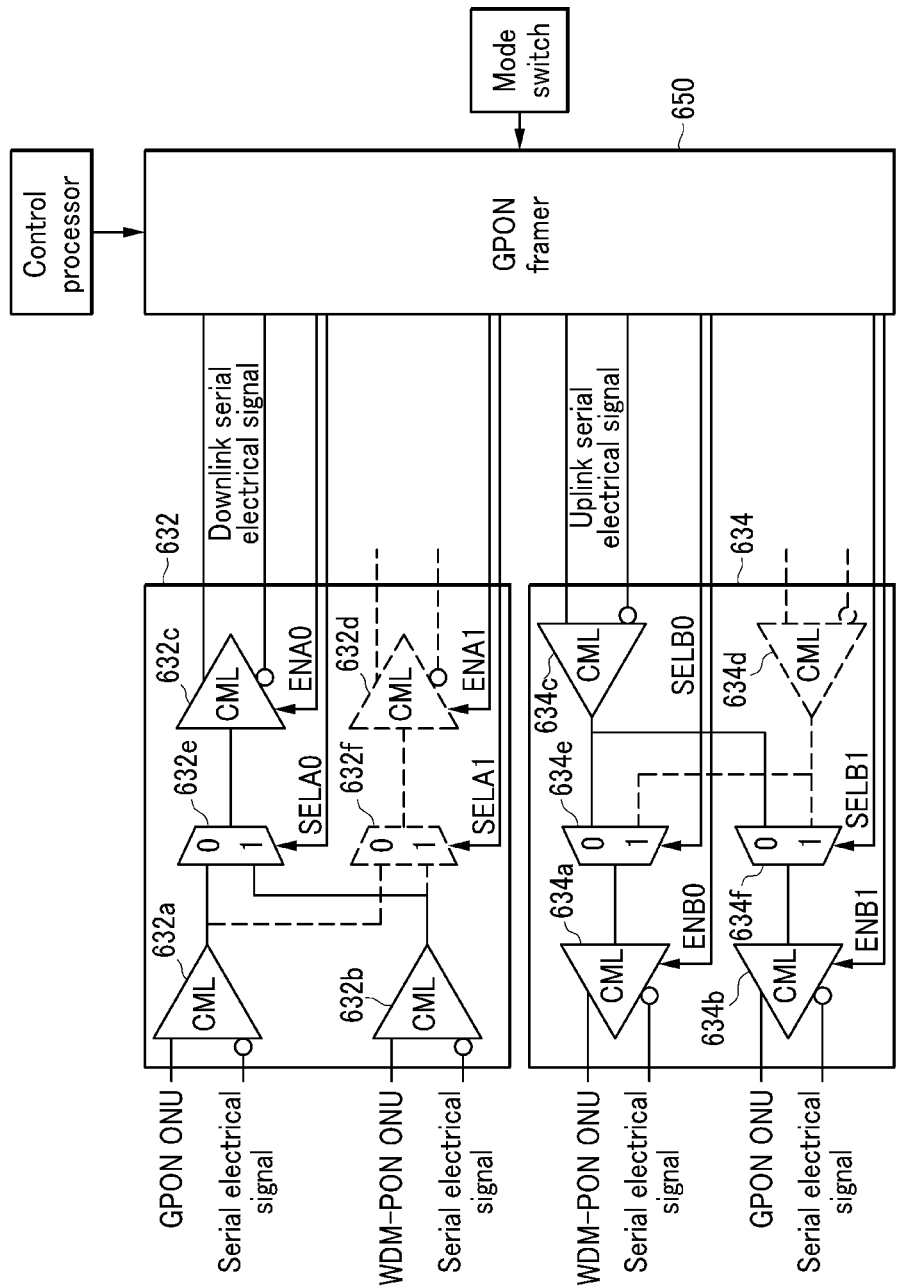
FIG. 6 is a diagram illustrating an output of a relaying mode control signal for selecting a relaying mode of a hybrid relaying apparatus 600 according to an embodiment of the present invention.

FIG. 6 is a diagram illustrating an output of a relaying mode control signal for selecting a relaying mode of a hybrid relaying apparatus 600 according to an embodiment of the present invention.

In FIG. 6, for convenience of description, one serial signal selector 630 is shown, and it is assumed that in the serial signal selector 630, two ports are provided in each of the uplink transmission and the downlink transmission and only one port of two ports is used.

Referring to FIG. 6, the serial signal selector 630 includes a downlink selection unit 632 and a downlink selection unit 634. The downlink selection unit 632 includes four transmission logic units 632a, 632b, 632c, and 632d and two multiplexers 632e and 632f, and the uplink selection unit 634 includes four transmission logic units 634a, 634b, 634c, and 634d and two multiplexers 634e and 634f. The transmission logic units 632a to 632d and 634a to 634d are logic units used to transmit the serial electrical signal, and for example, may be current mode logic (CML) units.

The transmission logic unit 632a transmits the received GPON ONU serial electrical signal to input No. "0" of the multiplexers 632e and 632f, and the transmission logic unit 632b transmits the received WDM-PON ONU serial electrical signal to input No. "1" of the multiplexers 632e and 632f. The multiplexers 632e and 632f transmit the outputs to the transmission logic units 632c and 632d, the transmission logic unit 632c transmits the downlink serial electrical signal corresponding to the output to the GPON framer 650, and the transmission logic unit 632d transmits the downlink serial electrical signal corresponding to the output to the GPON framer 650 or the other device.

The transmission logic unit 634c receives the uplink serial electrical signal from the GPON framer 650 and transmits the received uplink serial electrical signal to input No. "0" of the multiplexers 634e and 634f, and the transmission logic unit 634d receives the uplink serial electrical signal from the GPON framer 650 or the other device and transmits the received uplink serial electrical signal to No. "1" of the multiplexers 634e and 634f. The multiplexers 634e and 634f transmit the outputs to the transmission logic units 634a and 634b, respectively, the transmission logic unit 634a outputs the output as the WDM-PON ONU serial electrical signal, and the transmission logic unit 634b outputs the output as the GPON ONU serial electrical signal.

In this case, the multiplexers 632e, 632f, 634e, and 634f operate in response to control signals SELA0, SELA1, SELB0, and SELB1 and output a signal of input No. "1" when the corresponding control signals SELA0, SELA1, SELB0, and SELB1 have a value of "1" and output a signal of input No. "0" when the corresponding signals have a value of "0". The transmission logic units 632a, 632b, 632c, and 632d operate in response to control signals ENA0, ENA1, ENB0, and ENB1, and output the input signal when the corresponding control signals ENA0, ENA1, ENB0, and ENB1 have the value of "1" and interrupt the input signal when the corresponding control signals ENA0, ENA1, ENB0, and ENB1 have the value of "0".

The GPON framer 650 transmits the control signals SELA0, SELA1, SELB0, SELB1, ENA0, ENA1, ENB0, and ENB1 to the serial signal selector 630. The control signals SELA0, SELA1, SELB0, SELB1, ENA0, ENA1, ENB0, and ENB1 may be received from the central office. The central office can monitor the state of the hybrid relaying apparatus 600 through the OMCI packet inserted into the uplink GTC frame, and can select and direct a proper relaying mode. The central office can direct the relaying mode to the GPON framer 650 by using a mode switch or a control processor.

The relaying mode control signal transmitted to the serial signal selector 630 is shown in Table 1.

TABLE 1

| Relaying mode | ENA0 | SELA0 | ENB0 | ENB1 |
|---|---|---|---|---|
| WDM-PON relaying mode | 1 | 1 | 1 | 0 |
| GPON relaying mode | 1 | 0 | 0 | 1 |

In the downlink transmission, since one output port is not used, ENA1 and SELA1 output "0" at all times. In the uplink transmission, since one input port is not used, SELB0 and SELB1 output "0" at all times.

When the control signal represents "1", the serial signal selector 630 operates in the GPON relaying mode, and when the relaying mode control signal represents "0", the serial signal selector 630 operates in the WDM-PON relaying mode.

Figure 7:
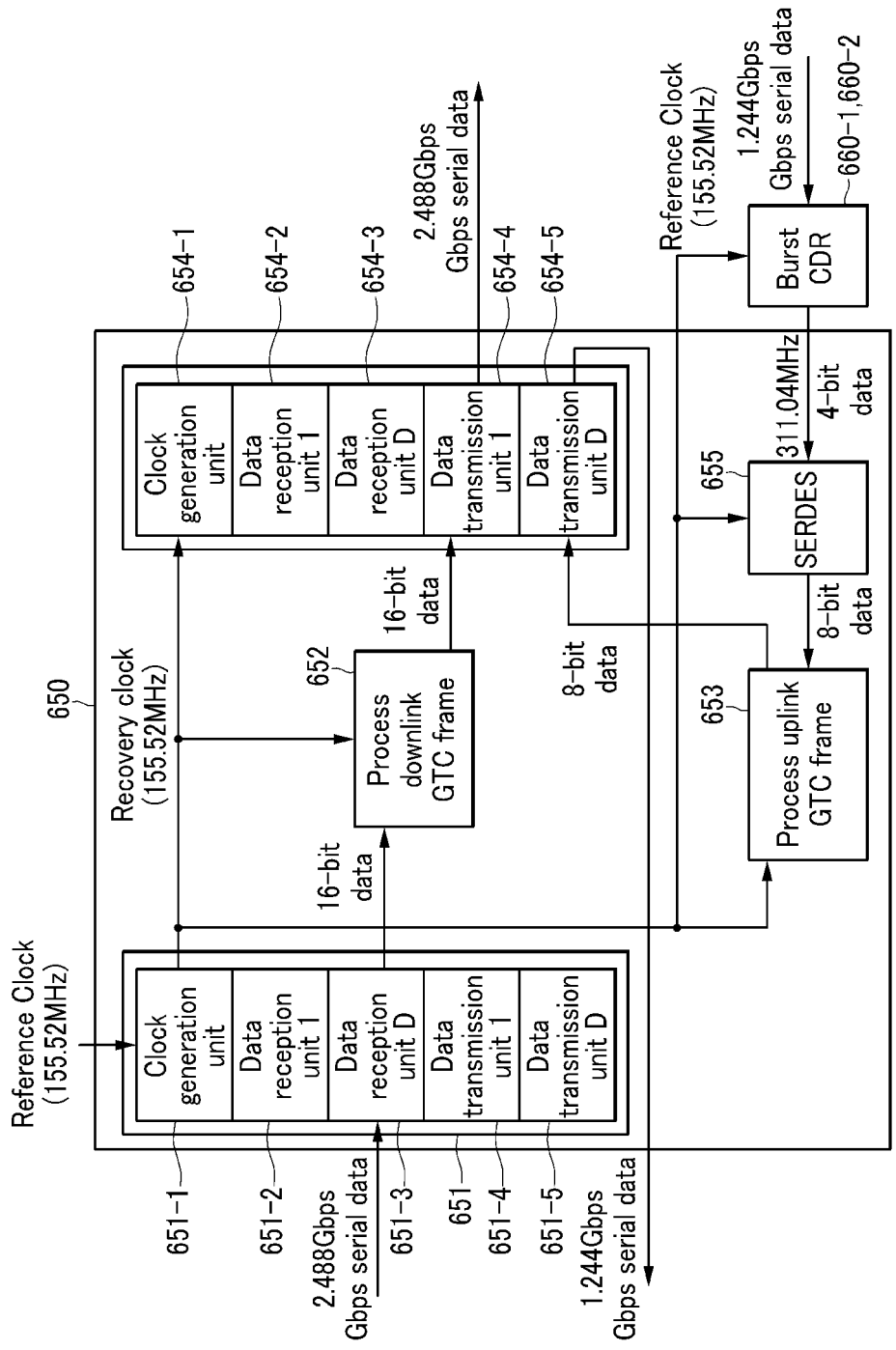
FIG. 7 is a block diagram illustrating a structure of a GPON framer 650 according to an embodiment of the present invention.
Figure 8:
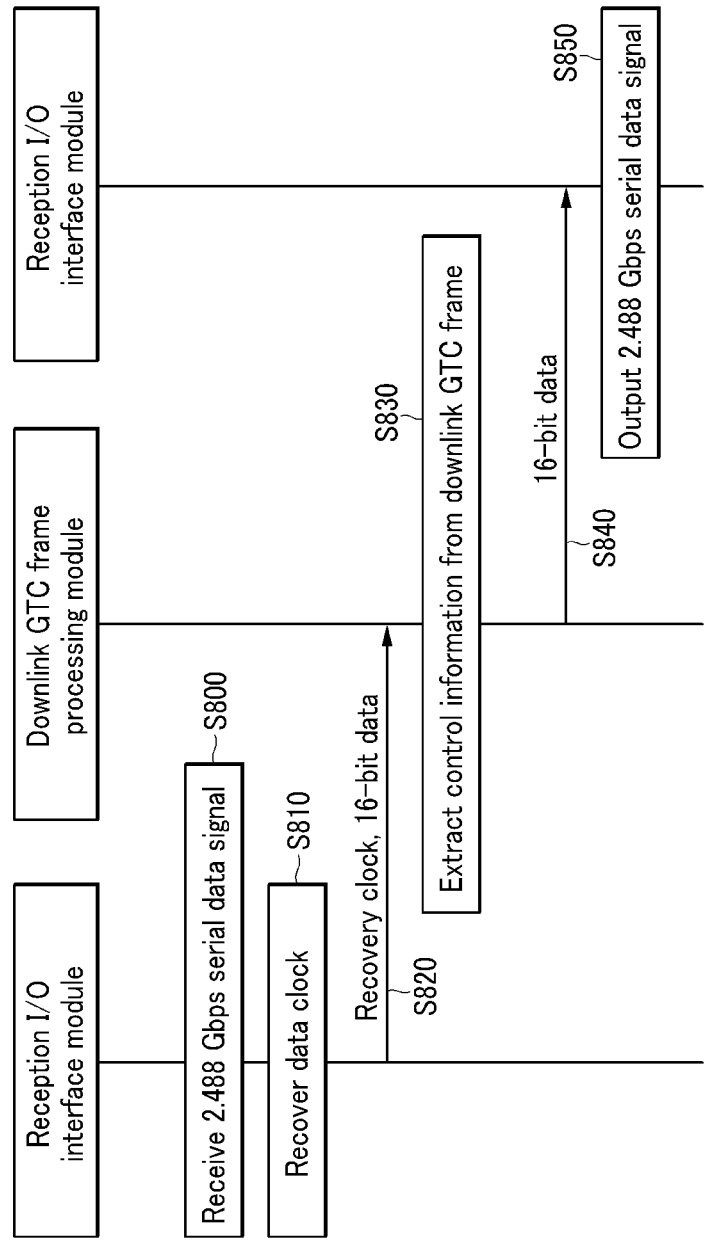
FIG. 8 is a flowchart illustrating a processing method of a downlink signal passing through a GPON framer 650.
Figure 9:
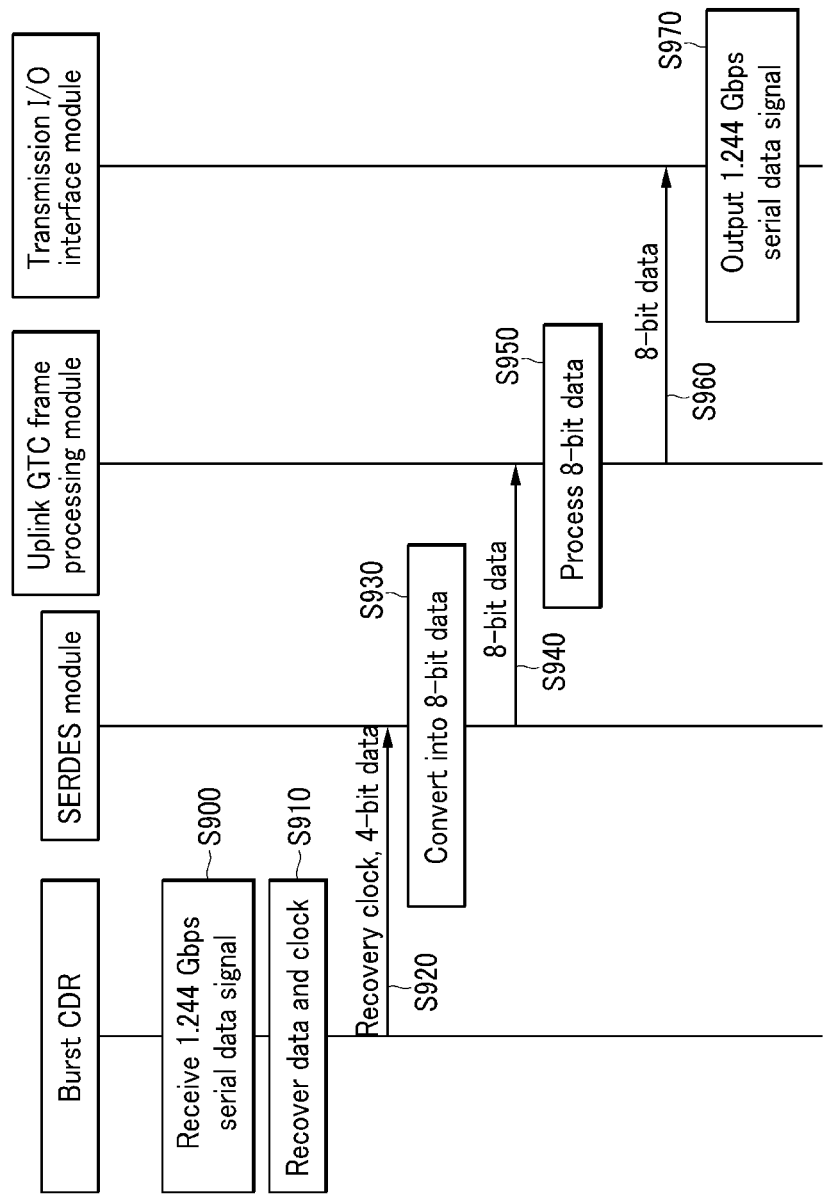
FIG. 9 is a flowchart illustrating a processing method of an uplink signal passing through a GPON framer 650.

FIG. 7 is a block diagram illustrating a structure of a GPON framer 650 according to an embodiment of the present invention, FIG. 8 is a flowchart illustrating a processing method of a downlink signal passing through a GPON framer 650, and FIG. 9 is a flowchart illustrating a processing method of an uplink signal passing through a GPON framer 650.

Referring to FIG. 7, the GPON framer 650 includes a reception I/O interface module 651, a downlink GTC frame processing module 652, an uplink GTC frame processing module 653, a transmission I/O interface module 654, and a SERDES module 655. The reception I/O interface module 651 includes a clock generation unit 651-1, data reception units 651-2 and 651-3, and data transmission units 651-4 and 651-5. The transmission I/O interface module 654 includes a clock generation unit 654-1, data reception units 654-2 and 654-3, and data transmission units 654-4 and 654-5.

Referring to FIGS. 7 and 8, the reception I/O interface module 651 receives a serial data signal of 2.488 Gb/s (S800), and recovers data and a clock from the serial data signal (S810). The reception I/O interface module 651 applies an external reference clock, i.e., 155.52 MHz, to the clock generation unit 651-1 in order to recover the serial data signal. The reception I/O interface module 651 extracts a parallel 16-bit data signal and a recovery clock, i.e., 155.52 MHz, by using the reference clock. Since the recovery clock is used in the GPON framer 650, the recovery clock may also be an internal clock.

The reception I/O interface module 651 transmits the recovery clock and the 16-bit data signal to the downlink GTC frame processing module 652 (S820), and the downlink GTC frame processing module 652 demultiplexes the downlink GTC frame through the recovery clock and the 16-bit data signal and extracts the control information from the downlink GTC frame (S830).

The downlink GTC frame processing module 652 transmits the 16-bit data signal to the transmission I/O interface module 654 (S840), and the transmission I/O interface module 654 converts the 16-bit data signal into the serial signal of 2.488 Gb/s and outputs the serial signal (S850). At this time, since the transmission I/O interface module 654 uses only a data transmission unit, the clock generation unit 654-1 may a recovery clock rather than the reference clock.

As such, in the downlink transmission, the GPON framer 650 of the hybrid relaying apparatus 600 recovers the data and clock by using the reference clock and downlink-transmits the data signal by using the recovery clock.

Referring to FIGS. 7 and 9, the burst CDRs 660-1 and 660-2 receive the serial data signal of 1.244 Gb/s (S900), and recovers the clock and data from the serial data signal (S910). At this time, the burst CDRs 660-1 and 660-2 may use the reference clock of 155.52 MHz from the outside in order to recover the clock and data. The reference clock used by the burst CDRs 660-1 and 660-2 may be the recovery clock recovered in the downlink transmission in the GPON framer 650. The burst CDRs 660-1 and 660-2 may extract a parallel 4-bit data signal and a clock of 311.04 MHz from the serial data signal of 1.244 Gb/s.

The burst CDRs 660-1 and 660-2 transmit the recovery clock and the 4-bit data to the SERDES module 655 (S920), and the SERDES module 655 converts a 4-bit data signal into a 8-bit data signal (S930) and transmits the converted signal to the uplink GTC frame processing module 653 (S940). The uplink GTC frame processing module 653 processes the 8-bit data signal by using the recovery clock recovered in the downlink transmission (S950), and transmits the 8-bit data signal to the transmission I/O interface module 654 (S960).

The transmission I/O interface module 654 converts and outputs the 8-bit data signal received from the uplink GTC frame processing module 653 into the serial data signal of 1.244 Gb/s (S970).

As such, since the clock recovered in the downlink transmission is used for the uplink transmission, the uplink transmission synchronized with the GPON OLT 210 is available.

Figure 10:
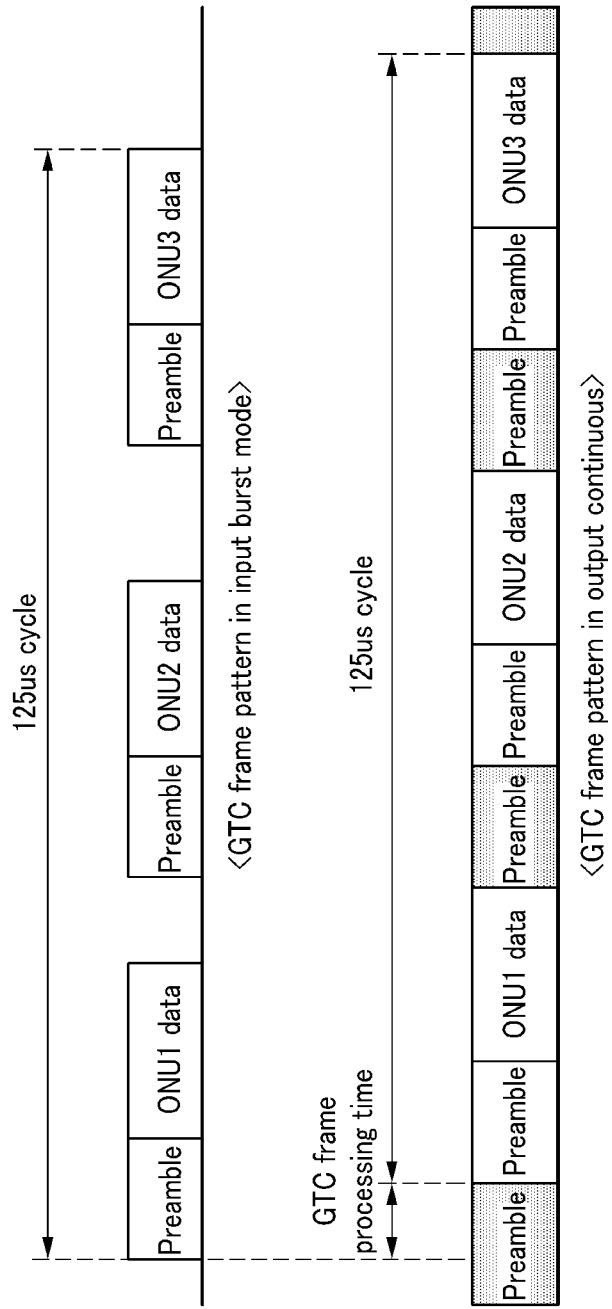
FIG. 10 is a diagram illustrating processing of an uplink GTC frame according to an embodiment of the present invention.

FIG. 10 is a diagram illustrating processing of an uplink GTC frame according to an embodiment of the present invention.

Referring to FIG. 10, the uplink GTC frame is the burst signal. That is, data is transmitted from each GPON ONU with the burst, such that a partial section without data is provided. The uplink GTC frame processing module 653 may insert the preamble into a partial section without data. At this time, the GPON framer 650 can find a partial section without data from the control information extracted from the downlink GTC frame in the downlink transmission. Accordingly, the uplink GTC frame outputted from the uplink GTC frame processing module 653 may be a continuous signal. As a result, the continuous signal may be transmitted in the section to which the WDM-PON technology is applied. A delay time for the uplink GTC frame processing module 653 to process the uplink GTC frame may be taken.

Figure 11:
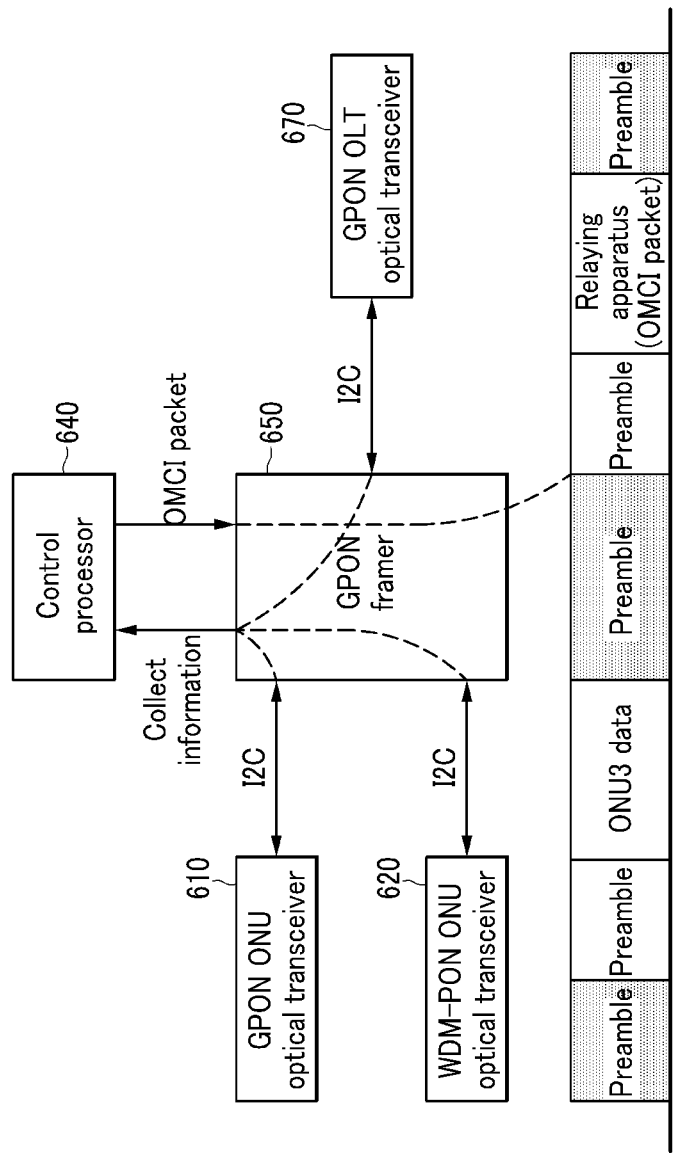
FIG. 11 illustrates a method for monitoring states of optical transceivers in a hybrid relaying apparatus 600 according to an embodiment of the present invention.

FIG. 11 illustrates a method for monitoring states of optical transceivers in a hybrid relaying apparatus 600 according to an embodiment of the present invention.

Referring to FIG. 11, the GPON framer 650 periodically or aperiodically monitors the GPON ONU optical transceiver 610, the WDM-PON ONU optical transceiver 620, and the GPON OLT optical transceiver 670 through an I2C interface. The control processor 640 collects the state monitoring information of the GPON ONU optical transceiver 610, the WDM-PON ONU optical transceiver 620, and the GPON OLT optical transceiver 670 from the GPON framer 650. When the central office requires the state monitoring information of the GPON ONU optical transceiver 610, the WDM-PON ONU optical transceiver 620, and the GPON OLT optical transceiver 670, the control processor 640 inserts the state monitoring information into the OMCI packet and transmits the OMCI packet to the GPON OLT 210 through the uplink frame. The OMCI packet may be inserted into a partial section of the uplink frame. For this, the GPON framer 650 needs to be ranged to the GPON OLT 210. Ranging the GPON framer 650 and the GPON OLT 210 is performed in the control processor 640.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of relaying an optical signal in a hybrid relaying apparatus of a gigabit passive optical network (GPON), comprising:
   receiving any one of a first downlink electrical signal corresponding to a downlink wavelength division multiplexing-passive optical network (WDM-PON) optical line terminal (OLT) optical signal or a second downlink electrical signal corresponding to a downlink GPON OLT optical signal;
   modulating the received downlink electrical signal to a downlink GPON transmission convergence (GTC) frame;
   extracting control information for uplink transmission from the downlink GTC frame;
   converting the downlink GTC frame into the downlink electrical signal;
   converting the converted downlink electrical signal into an optical signal in a GPON OLT optical transceiver; and
   transmitting the converted optical signal to a GPON optical network unit (ONU); wherein
   the receiving the any one of the first downlink electrical signal or the second downlink electrical signal comprises:
   receiving the downlink WDM-PON OLT optical signal and converting it into the first downlink electrical signal;
   receiving the downlink GPON OLT optical signal and converting it into the second downlink electrical signal; and
   selecting one of the first downlink electrical signal or the second downlink electrical signal depending on a relaying mode.

2. The method of claim 1, wherein
   the control information comprises at least one of band allocation information, information on an effective section, and clock information of the optical signal uplink-transmitted from the GPON ONU.

3. The method of claim 2, further comprising:
   converting a burst optical signal uplink-transmitted from the GPON ONU into a serial electrical signal by using the information on the effective section;
   converting the serial electrical signal into a parallel electrical signal by using the clock information;
   modulating the parallel electrical signal to a burst uplink GTC frame; and
   inserting a preamble into an empty section of the burst uplink GTC frame and modulating it to a continuous uplink GTC frame.

4. The method of claim 3, further comprising:
   converting the modulated continuous uplink GTC frame into an uplink electrical signal;

converting the uplink electrical signal into any one of an uplink WDM-PON OLT optical signal and an uplink GPON OLT optical signal depending on a relaying mode; and transmitting the converted optical signal to the GPON OLT.

5. The method of claim 1, wherein
the relaying mode is determined by an ONT management control interface (OMCI) packet inserted into an uplink GPON transmission convergence (GTC) frame.

6. The method of claim 5, wherein
the OMCI packet comprises state monitoring information of the hybrid relaying apparatus.

7. The method of claim 1, wherein
the converting the optical signal into the first downlink electrical signal comprises converting the downlink WDM-PON OLT optical signal into the first downlink electrical signal by using a reflective semiconductor optical amplifier (RSOA)-type optical transceiver.

8. A hybrid relaying apparatus in a gigabit passive optical network (GPON), comprising:
a GPON framer modulating any one of a first downlink electrical signal corresponding to a downlink wavelength division multiplexing-passive optical network (WDM-PON) optical line terminal (OLT) optical signal and a second downlink electrical signal corresponding to a downlink GPON OLT optical signal to a downlink GPON transmission convergence (GTC) frame, extracting control information for uplink transmission from the downlink GTC frame, and converting the downlink GTC frame into an electrical signal; and
a GPON OLT optical transceiver converting the converted electrical signal into an optical signal;
wherein
the GPON OLT optical transceiver converts a burst optical signal uplink-transmitted from a GPON ONU into a serial electrical signal by using the control information.

9. A hybrid relaying apparatus in a gigabit passive optical network (GPON), comprising:
a GPON framer modulating any one of a first downlink electrical signal corresponding to a downlink wavelength division multiplexing-passive optical network (WDM-PON) optical line terminal (OLT) optical signal and a second downlink electrical signal corresponding to a downlink GPON OLT optical signal to a downlink GPON transmission convergence (GTC) frame, extracting control information for uplink transmission from the downlink GTC frame, and converting the downlink GTC frame into an electrical signal; and
a GPON OLT optical transceiver converting the converted electrical signal into an optical signal;
wherein
the GPON framer inserts a preamble into an empty section of a burst uplink GTC frame and modulates it to a continuous uplink GTC frame by using the control information.

10. The apparatus of claim 8, further comprising:
a WDM-PON optical network unit (ONU) optical transceiver receiving the downlink WDM-PON OLT optical signal and converting it into the first downlink electrical signal;
a GPON-ONU optical transceiver receiving the downlink GPON OLT optical signal and converting it into the second downlink electrical signal; and
a serial signal selector selecting one of the first downlink electrical signal and the second downlink electrical signal depending on the relaying mode.

11. The apparatus of claim 10, wherein
the GPON framer collects state monitoring information from the WDM-PON ONU optical transceiver, the GPON ONU optical transceiver, and the GPON OLT optical transceiver.

12. The apparatus of claim 11, wherein
the GPON framer inserts an ONT management control interface (OMCI) packet comprising the state monitoring information into an uplink-transmitted frame and transmits it.

13. The apparatus of claim 8, further comprising
a control processor for ranging a GPON OLT and the GPON framer.

* * * * *